United States Patent
Yang et al.

(10) Patent No.: US 9,450,932 B2
(45) Date of Patent: Sep. 20, 2016

(54) MOBILE DEVICE AND INFORMATION PROTECTION METHOD THEREOF

(71) Applicant: HTC CORPORATION, Taoyuan County (TW)

(72) Inventors: Wei-Chung Yang, Taoyuan County (TW); Zih-Ci Lin, Taoyuan County (TW); Ruey-Jer Chang, Taoyuan County (TW)

(73) Assignee: HTC CORPORATION, Taoyuan County (TW)

( * ) Notice: Subject to any disclaimer, the term of this patent is extended or adjusted under 35 U.S.C. 154(b) by 0 days.

(21) Appl. No.: 14/020,170

(22) Filed: Sep. 6, 2013

(65) Prior Publication Data

US 2015/0074762 A1 Mar. 12, 2015

(51) Int. Cl.
*H04L 29/06* (2006.01)
*G06F 21/34* (2013.01)
*G06F 21/62* (2013.01)

(52) U.S. Cl.
CPC .............. *H04L 63/08* (2013.01); *G06F 21/34* (2013.01); *G06F 21/629* (2013.01); *H04L 63/0853* (2013.01)

(58) Field of Classification Search
None
See application file for complete search history.

(56) References Cited

U.S. PATENT DOCUMENTS

| 7,314,169 B1* | 1/2008 | Jasper et al. ................... 235/382 |
| 2001/0019614 A1* | 9/2001 | Madoukh ...................... 380/277 |
| 2008/0113618 A1* | 5/2008 | De Leon et al. ............ 455/41.2 |
| 2009/0247122 A1* | 10/2009 | Fitzgerald et al. ........... 455/410 |
| 2014/0208447 A1 | 7/2014 | Berger |

FOREIGN PATENT DOCUMENTS

TW 201333746 A 8/2013

OTHER PUBLICATIONS

Taiwanese Office Action corresponding to Application No. 10420189940; Date of Mailing: Feb. 11, 2015, with English translation.

* cited by examiner

*Primary Examiner* — David Le
(74) *Attorney, Agent, or Firm* — Cantor Colburn LLP

(57) ABSTRACT

A mobile device and an information protection method are presented. The mobile device includes a sensor, a storage and a processor that is electrically connected with the sensor and the storage. The sensor is configured to sense at least one electronic device. The processor is configured to determine an authority of the at least one electronic device and define a protection state for at least one part of the information stored in the storage according to the authority. The information protection method is applied to the mobile device to implement the aforesaid operations.

4 Claims, 5 Drawing Sheets

# MOBILE DEVICE AND INFORMATION PROTECTION METHOD THEREOF

FIELD OF THE INVENTION

The present invention relates to a mobile device and an information protection method thereof. More specifically, the present invention relaters to a mobile device that protects the information automatically through sense and an information protection method thereof.

DESCRIPTION OF THE RELATED ART

Nowadays, mobile devices have become indispensable to modern people's daily lives. As people rely more on mobile devices, more information is stored in the mobile devices so that users can read the information anywhere and at any time. However, as more information is stored, there is more risk in more stolen information if there are not enough security measures for protecting the information. Because of the mobility of mobile devices, the information security of the mobile devices may be easily threatened. The following scenarios illustrate this problem. If a user lends his mobile device to somebody else, it is possible that information stored in the mobile device may be stolen. If a user loses his mobile device, it is possible that the information stored in the mobile device will be stolen. If there is somebody else or some other electronic devices around when the user is using his mobile device, it is possible that the information stored in the mobile device may also be stolen.

A user of conventional mobile devices may pre-protect secured information. Alternatively, the user may also protect the information immediately when the information is suspected to be stolen. However, the former is not flexible in use and cannot adaptively protect the information in various circumstances, while the latter cannot protect information in real time. In other words, conventional mobile devices cannot protect information stored therein effectively and in real time.

Accordingly, it is important for conventional mobile devices to protect information stored therein effectively and in real time.

CONTENTS OF THE INVENTION

The primary objective of the present invention is to improve conventional mobile devices so that they can protect information stored therein effectively and in real time. To this end, the present invention provides a mobile device, which comprises a sensor, a storage and a processor electrically connected with the sensor and the storage. The sensor is configured to sense at least one electronic device. The processor is configured to determine an authority of the at least one electronic device and define a protection state for at least one part of the information stored in the storage according to the authority.

To this end, the present invention further provides an information protection method for a mobile device. The mobile device comprises a sensor, a storage and a processor electrically connected with the sensor and the storage. The information protection method comprises the following steps:

(a) enabling the sensor to sense at least one electronic device;

(b) enabling the processor to determine an authority of the at least one electronic device; and (c) enabling the processor to define a protection state for at least one part of information stored in the storage according to the authority.

By using the sensor to sense whether at least one electronic device exists therearound, the mobile device of the present invention can determine whether it is necessary to protect the stored information in real time. By using the processor to determine an authority of the at least one electronic device, the mobile device of the present invention can determine whether the at least one electronic device endangers the stored information. Then, the protection state for at least one part of the information stored in the storage is defined according to the authority so that the mobile device of the present invention can determine whether to protect the stored information depending on different conditions. Through the aforesaid operations, the mobile device and the information protection method thereof according to the present invention can determine whether to protect the information automatically and in real time depending on different conditions. Thereby, the present invention allows conventional mobile devices to protect the information stored therein effectively and in real time.

The detailed technology and preferred embodiments implemented for the subject invention are described in the following paragraphs accompanying the appended drawings for people skilled in this field to well appreciate the features of the claimed invention.

DESCRIPTION OF EMBODIMENTS

In the following description, the present invention will be explained with reference to embodiments thereof. However, these embodiments are not intended to limit the present invention to any specific environment, applications or particular implementations described in these embodiments. Therefore, the description of these embodiments is only for the purpose of illustration rather than limitation. It should be appreciated that elements unrelated to the present invention are omitted from depiction in the following embodiments and attached drawings. In addition, dimensional relationships among individual elements in the attached drawings are illustrated only for ease of understanding, but not to limit the actual scale.

Figure 1:
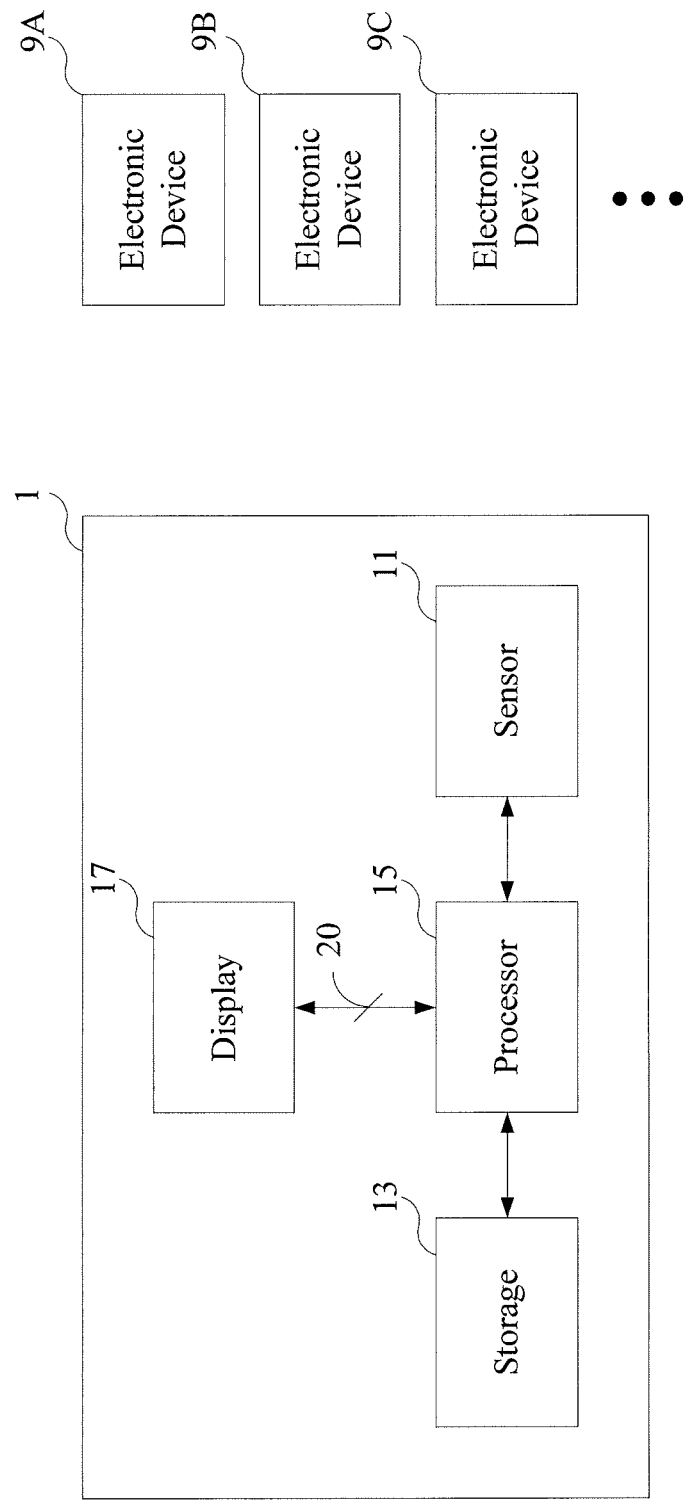
FIG. 1 is a schematic structural view of a mobile device according to a first embodiment of the present invention.

A first embodiment of the present invention relates to a mobile device. A schematic structural view of the mobile device is shown in FIG. 1. As shown in FIG. 1, the mobile device 1 comprises a sensor 11, a storage 13, a processor 15 and a display 17. The processor 15 is electrically connected with the sensor 11, the storage 13 and the display 17. Substantially, the mobile device 1 may be implemented in various forms. For example, the mobile device 1 may be, but not limited to, a conventional mobile phone, a smart mobile phone, a tablet computer, a notebook computer, a personal digital assistant (PDA), an electronic book, a digital camera, a mobile navigation device, a mobile game machine, a digital watch, a pair of digital eyeglasses or the like.

The storage 13 is configured to store various pieces of information 20. For example, the information may be, but not limited to, messages, mails, recorded audio files, photos, movies, call records, network browsing records, consumption records, personal basic information, applications, address lists or the like. To prevent such information from being stolen, the sensor 11 can sense whether at least one (i.e., one or more) electronic device (e.g., the electronic device 9A, the electronic device 9B and the electronic device 9C shown in FIG. 1A) exists therearound continuously or at regular times depending on different needs. Through the aforesaid operation of the sensor 11, the mobile device 1 can determine whether it is necessary to protect the information 20 stored in the storage 13 in real time.

The sensor 11 may sense whether at least one electronic device exists therearound according to various wireless communication network protocols. For example, these wireless communication network protocols may include, but are not limited to, the Bluetooth communication protocol, the Wi-Fi communication protocol, the UWB (Ultra-Wide-Band) communication protocol, the Zigbee communication protocol or the like. Additionally, the electronic device described in this embodiment may be in various forms. For example, the electronic device may be, but not limited to, a conventional mobile phone, a smart mobile phone, a tablet computer, a notebook computer, a personal digital assistant (PDA), an electronic book, a digital camera, a mobile navigation device, a mobile game machine, a digital watch, a pair of digital eyeglasses, a desktop computer, a digital TV, a wireless router, a wireless access point (AP) or other electronic device with wireless communication.

If at least one electronic device is sensed by the sensor 11, the processor 15 further determines an authority of the at least one electronic device to determine whether the at least one electronic device endangers at least one part of the information 20 (i.e., parts or the whole of the information 20) stored in the storage 13. Then, the processor 15 defines a protection state for the at least one part of information 20 stored in the storage 13 according to the authority.

In this embodiment, a predetermined name list may be stored in the storage 13, and the processor 15 determines the authority of the at least one electronic device according to the predetermined name list. The predetermined name list may comprise a white name list, a black name list or a combination thereof. Under the assumption that the predetermined name list only comprises a white name list, if the at least one electronic device sensed by the sensor 11 has already been listed in the white name list (e.g., the MAC address of the at least one electronic device has already been listed in the white name list), the processor 15 determines the authority of the at least one electronic device that is permitted. Otherwise, the processor 15 determines the authority of the at least one electronic device to be not permitted. On the other hand, assume that the predetermined name list comprises only a black list. Under the assumption, if the at least one electronic device sensed by the sensor 11 has already been listed in the black name list, the processor 15 determines the authority of the at least one electronic device to not be permitted. Otherwise, the processor 15 determines the authority of the at least one electronic device that is permitted.

Furthermore, under the assumption that the predetermined name list comprises a white list and a black list, if the electronic device sensed by the sensor 11 has already been listed in the white name list or the black name list, the processor 15 determines the authority of the at least one electronic device that is permitted or not permitted, respectively. If the at least one electronic device sensed by the sensor 11 is not listed in the white name list or the black name list, then the processor 15 can determine the authority of the at least one electronic device that is permitted or not permitted according to a predetermined determination mechanism.

In other embodiments, the processor 15 may also determine the authority of the at least one electronic device, which is sensed by the sensor 11, in other ways. As non-limiting examples, the processor 15 may determine the authority of the at least one electronic device according to a communication history between the at least one electronic device and the mobile device 1, according to a distance between the at least one electronic device and the mobile device 1, according to signal strength of the at least one electronic device, etc. First, a case where only one electronic device (e.g., the electronic device 9A) is sensed by the sensor 11 will be described. After the electronic device 9A is sensed by the sensor 11, the processor 15 further determines an authority of the electronic device 9A. If the authority of the electronic device 9A is determined to be permitted, the processor 15 defines the protection state of at least one part of the information 20 stored in the storage 13 to be public according to the authority. Otherwise, if the authority of the electronic device 9A is determined to not be permitted, the processor 15 defines the protection state of the at least one part of information 20 stored in the storage 13 to be private according to the authority.

Next, a case where a plurality of electronic devices (e.g., the electronic device 9A, the electronic device 9B and the electronic device 9C) is sensed by the sensor 11 simultaneously will be described. After the electronic device 9A, the electronic device 9B and the electronic device 9C are sensed by the sensor 11, the processor 15 further determines the authorities of the electronic device 9A, the electronic device 9B and the electronic device 9C. Then, the processor 15 can execute different subsequent operations according to predetermined settings. Herein, subsequent operations of the processor 15 will be described with reference to the following three examples; however, these examples are not intended to limit the implementations of the present invention.

The first kind of subsequent operation is as follows: as long as the authority of one of the electronic device 9A, the electronic device 9B and the electronic device 9C is determined to be permitted, the processor 15 defines a protection state of the at least one part of information 20 stored in the storage 13 to be public according to the authority. Otherwise, that is the authorities of the electronic device 9A, the electronic device 9B and the electronic device 9C are all determined to not be permitted, the processor 15 defines the protection state of the at least one part of information 20 stored in the storage 13 to be private according to the authorities.

The second kind of operation is as follows: as long as the authority of one of the electronic device 9A, the electronic device 9B and the electronic device 9C is determined to be not permitted, the processor 15 defines the protection state of the at least one part of information 20 stored in the storage 13 to be private according to the authority. Otherwise, that is the authorities of the electronic device 9A, the electronic device 9B and the electronic device 9C are all determined to be permitted, the processor 15 defines the protection state of the at least one part of information 20 stored in the storage 13 to be public according to the authorities.

The third kind of subsequent operation is as follows: as long as the authorities of a majority of the electronic device 9A, the electronic device 9B and the electronic device 9C are determined to be permitted, the processor 15 defines the protection state of the at least one part of information 20 stored in the storage 13 to be public according to the authorities. Otherwise, the authorities of the majority of the electronic device 9A, the electronic device 9B and the electronic device 9C are determined to not be permitted, the processor 15 defines the protection state of the at least one part of information 20 stored in the storage 13 to be private according to the authorities.

If the protection state of the at least one part of information 20 stored in the storage 13 is defined to be public, this means that the at least one part of information 20 is not under protection. If the protection state of the at least one part of information 20 stored in the storage 13 is defined to be private, this means that the at least one part of information 20 is under protection. The at least one part of information 20 under protection may be protected in different ways. For example, it may be protected through encryption, through concealment, through limiting the read scope or the like. The protection through encryption means that the at least one part of information 20 under protection will be encrypted; protection through concealment means that the at least one part of information 20 under protection will be concealed; and protection through limiting the read scope means that the at least one part of information 20 under protection cannot be read completely.

For protection through concealment, the display 17 displays the at least one part of information 20 when the protection state of the at least one part of information 20 is defined to be public, and conceals the at least one part of information 20 when the protection state of the at least one part of information 20 is defined to be private. It shall be appreciated that the display 17 may not be disposed on the mobile 1 when the function of concealment for protection is not needed. In other words, disposing a display 17 is just a preferred option for the mobile device 1, but is not intended to limit the implementations of the mobile device 1.

According to the above descriptions, the mobile device 1 can protect the information effectively and in real time under different conditions. For example, the following rule may be preset in the mobile device 1: only when a specific electronic device (e.g., another mobile phone, a tablet computer, a notebook computer, a digital camera, a digital watch or the like electronic device carried by the user) is sensed by the sensor 11 and the authority of the specific electronic device is determined by the processor 15 to be permitted, the processor 15 defines the protection state of the at least one part of information 20 stored in the storage 13 to be public. Otherwise, the processor 15 continuously defines the protection state of the at least one part of information 20 stored in the storage 13 to be private. Thus, even if the mobile apparatus 1 is lent to others or is lost, the protection state of the at least one part of information 20 will still be continuously defined to be private because of the absence of the specific electronic device existing therearound. Thereby, the at least one information 20 will not be stolen.

As another example, the following rule may be preset in the mobile device 1: as long as any electronic device is sensed by the sensor 11 and an authority of the electronic device is determined by the processor 15 to not be permitted, the processor 15 defines the protection state of the at least one part of information 20 stored in the storage 13 to be automatically private. Thus, if there is somebody else or some other electronic device around when the user is using his or her mobile device, the protection state of the at least one part of information 20 stored in the storage 13 will be continuously defined to be private because of the presence of the non-permitted electronic device existing therearound. Thereby, the part of information 20 will not be stolen.

Figure 2:
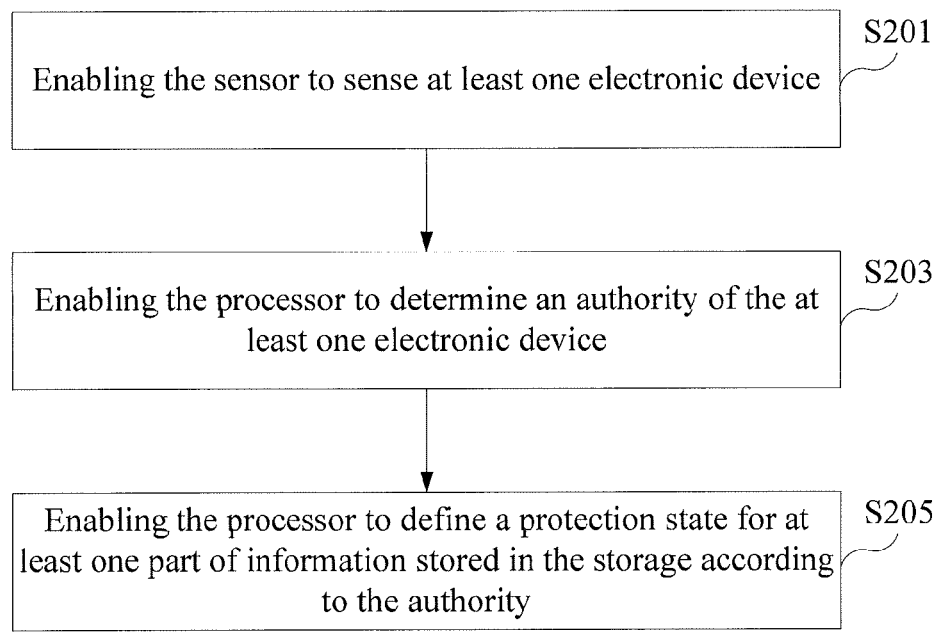
FIG. 2 is a flowchart diagram of an information protection method according to a second embodiment of the present invention.

A second embodiment of the present invention relates to an information protection method for a mobile device. A flowchart diagram of the information protection method is shown in FIG. 2. The mobile device described in this embodiment may be the mobile device 1 described in the first embodiment or an equivalent device, so it substantially comprises a sensor, a storage and a processor electrically connected with the sensor and the storage.

As shown in FIG. 2, at least one (i.e., one or more) electronic device is sensed by the sensor in step S201. Then, in step S203, an authority of the at least one electronic device is determined by the processor. The predetermined name list is preferably stored in the storage, and step S203 is as follows: the authority of the at least one electronic device is determined by the processor according to the predetermined name list. Next, in step S205, a protection state for at least one part of information stored in the storage is defined by the processor according to the authority.

The information protection method of this embodiment has substantially covered information protection methods to be described in a third embodiment, a fourth embodiment and a fifth embodiment hereinafter. Further, the information protection method of this embodiment is considered to include steps corresponding to all operations of the mobile device 1 of the first embodiment, and the way in which the information protection method of this embodiment executes the corresponding steps will be readily appreciated by those of ordinary skill in the art based on the explanation of the first embodiment.

Figure 3:
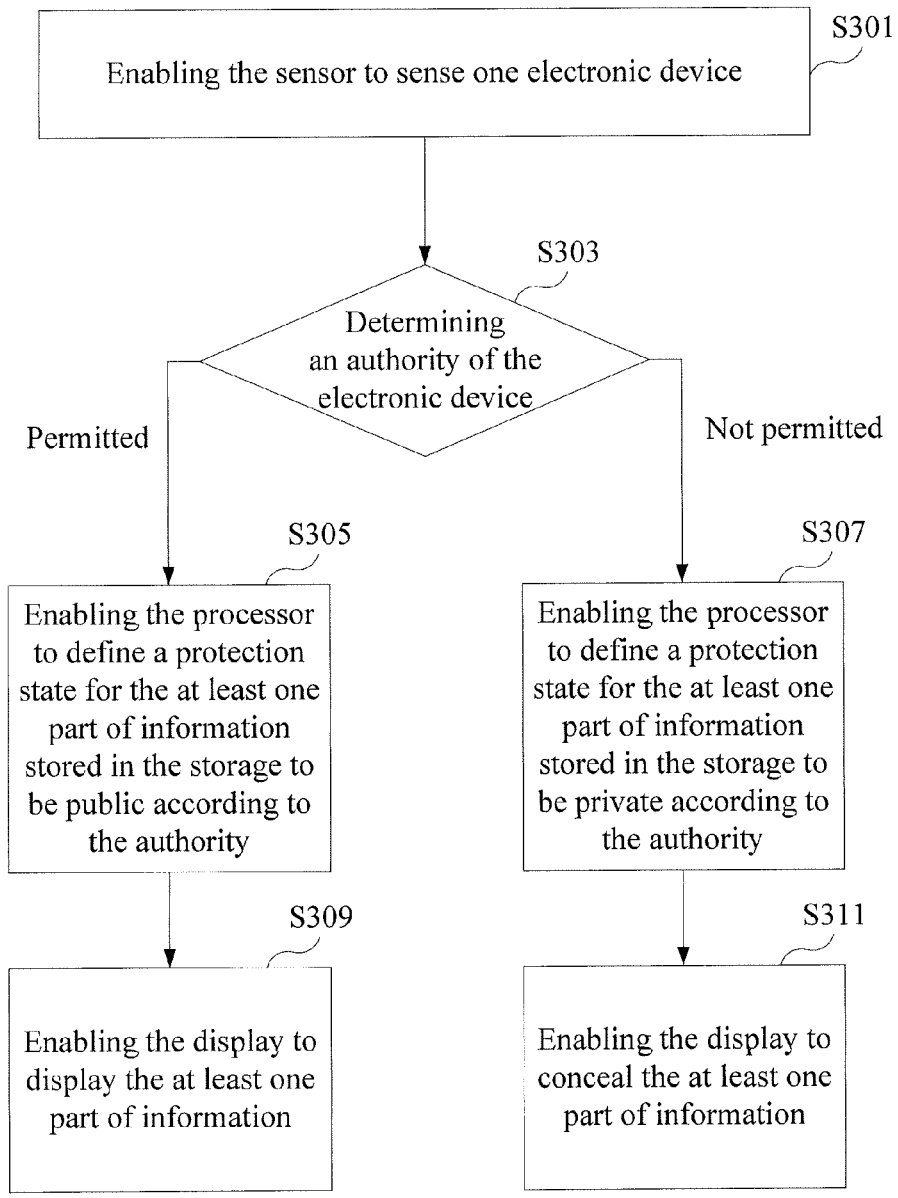
FIG. 3 is a flowchart diagram of an information protection method according to a third embodiment of the present invention.

The third embodiment of the present invention also relates to an information protection method for a mobile device. A flowchart diagram of the information protection method is shown in FIG. 3. The mobile device described in this embodiment may substantially be viewed as the mobile device 1 described in the first embodiment or an equivalent device, so it substantially comprises a sensor, a storage, an optional display, and a processor electrically connected with the sensor, the storage and the display.

As shown in FIG. 3, an electronic device is sensed by the sensor in step S301. Then, in step S303, an authority of the electronic device is determined by the processor. A predetermined name list is preferably stored in the storage. Step S303 is as follows: the authority of the electronic device is determined by the processor according to the predetermined name list.

If the authority of the electronic device is determined by the processor to be permitted in the step S303, then a protection state for the at least one part of information stored in the storage is defined by the processor to be public according to the authority in step S305. Optionally, step S309 is executed after the step S305 to enable the display to display the at least one part of information.

However, if the authority of the electronic device is determined by the processor to not be permitted in the step S303, then a protection state for the at least one part of information stored in the storage is defined by the processor to be private according to the authority in step S307.

Optionally, step S311 is executed after the step S307 to enable the display to conceal the at least one part of information.

Figure 4:
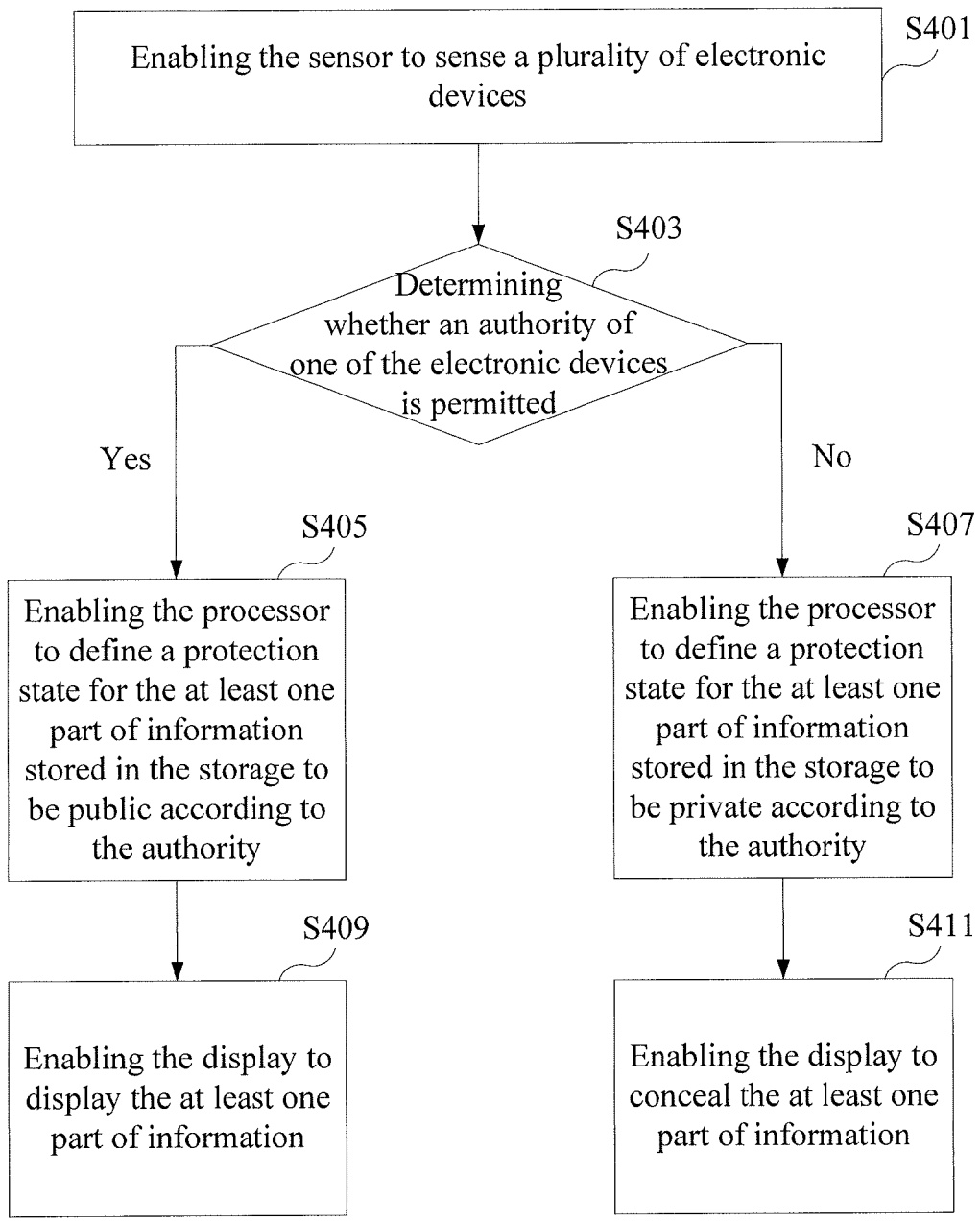
FIG. 4 is a flowchart diagram of an information protection method according to a fourth embodiment of the present invention.

The fourth embodiment of the present invention also provides an information protection method for a mobile device. A flowchart diagram of the information protection method is shown in FIG. 4. The mobile device described in this embodiment may substantially be viewed as the mobile device 1 described in the first embodiment or an equivalent device, so it substantially comprises a sensor, a storage, an optional display, and a processor electrically connected with the sensor, the storage and the display.

As shown in FIG. 4, a plurality of electronic devices is sensed by the sensor in step S401. Then in step S403, it is determined by the processor whether an authority of one of the electronic devices is permitted. A predetermined name list is preferably stored in the storage. Step S403 is as follows: the authorities of the electronic devices are determined by the processor according to the predetermined name list. In other embodiments, the step S403 may be as follows: it is determined by the processor whether authorities of a majority of the electronic devices are permitted.

If the authority of one of or the authorities of a majority of the electronic devices are determined by the processor to be permitted in the step S403, then a protection state for the at least one part of information stored in the storage is defined by the processor to be public according to the authority (authorities) in step S405. Optionally, step S409 is executed after the step S405 to enable the display to display the at least one part of information.

However, if the authority of one of or the authorities of a majority of the electronic devices are determined by the processor to not be permitted in the step S403, then a protection state for the at least one part of information stored in the storage is defined by the processor to be private according to the authority (authorities) in step S407. Optionally, step S411 is executed after step S407 to enable the display to conceal the at least one part of information.

Figure 5:
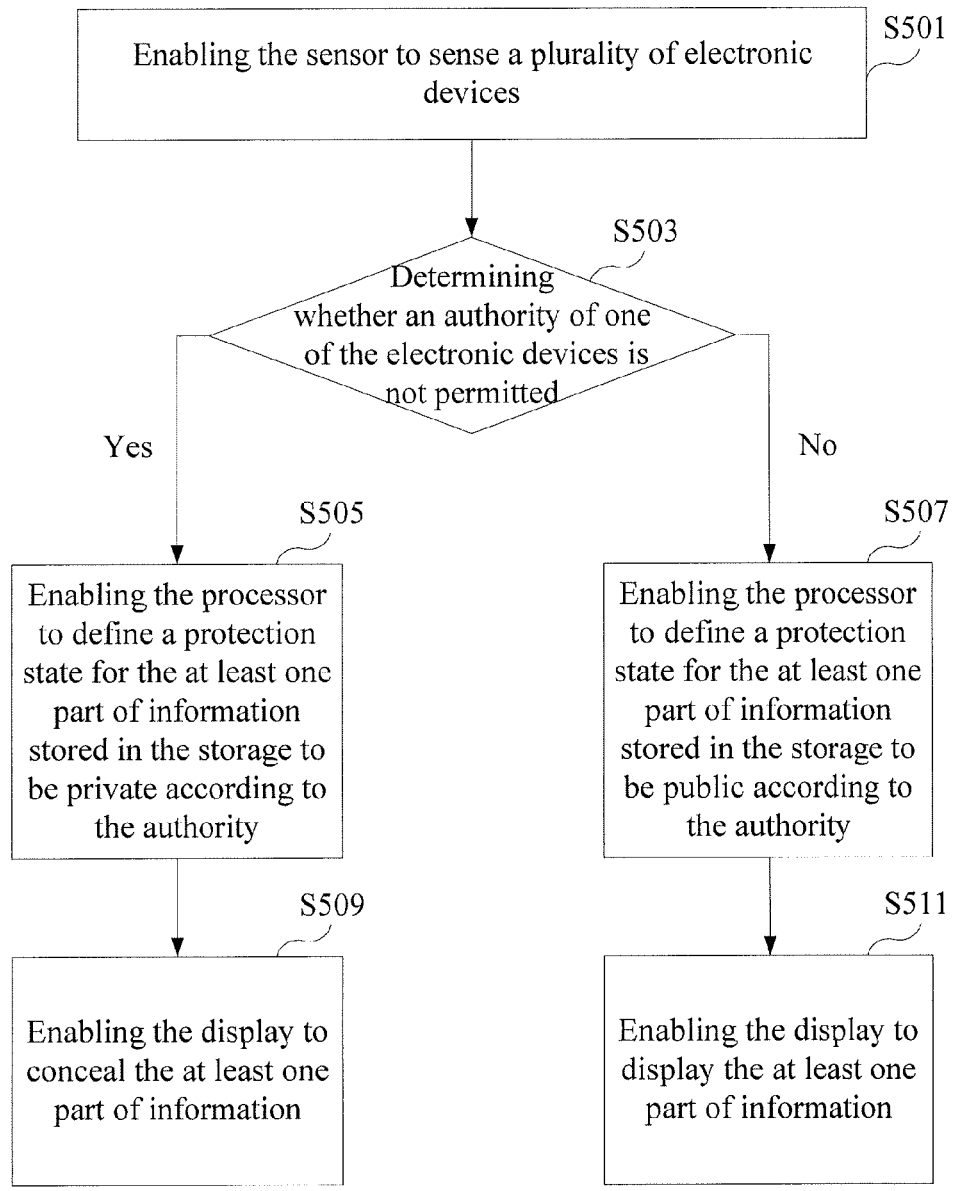
FIG. 5 is a flowchart diagram of an information protection method according to a fifth embodiment of the present invention.

The fifth embodiment of the present invention also provides an information protection method for a mobile device. A flowchart diagram of the information protection method is shown in FIG. 5. The mobile device described in this embodiment may substantially be viewed as the mobile device 1 described in the first embodiment or an equivalent device, so it substantially comprises a sensor, a storage, an optional display, and a processor electrically connected with the sensor, the storage and the display.

As shown in FIG. 5, a plurality of electronic devices is sensed by the sensor in step S501. Then, in step S503, it is determined by the processor whether an authority of one of the electronic devices is not permitted. A predetermined name list is preferable stored in the storage. Step S503 is as follows: the authorities of the electronic devices are determined by the processor according to the predetermined name list. In other embodiments, the step S503 may be as follows: it is determined by the processor whether authorities of a majority of the electronic devices are not permitted.

If the authority of one of or the authorities of a majority of the electronic devices are determined by the processor to not be permitted in step S503, then a protection state for the at least one part of information stored in the storage is defined by the processor to be private according to the authority (authorities) in step S505. Optionally, step S509 is executed after the step S505 to enable the display to conceal the at least one part of information.

However, if the authority of one of or the authorities of a majority of the electronic devices are determined by the processor to be permitted in the step S503, then a protection state for the at least one part of information stored in the storage is defined by the processor to be public according to the authority (authorities) in step S507. Optionally, step S511 is executed after step S507 to enable the display to display the at least one part of information.

According to the above descriptions, the mobile device of the present invention can determine whether it is necessary to protect the stored information in real time by using the sensor to sense whether at least one electronic device exists therearound. By using the processor to determine an authority of the at least one electronic device, the mobile device of the present invention can determine whether the at least one electronic device endangers the stored information. Then, a protection state is defined for at least one part of the information stored in the storage according to the authority so that the mobile device of the present invention can determine whether to protect the stored information depending on different conditions. Through the aforesaid operations, the mobile device and the information protection method thereof according to the present invention can determine whether to protect the information automatically and in real time depending on different conditions. Thereby, the present invention can improve that the conventional mobile devices cannot protect the stored information effectively and in real time.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

BRIEF DESCRIPTION OF REFERENCE NUMERALS

1: Mobile device
11: Sensor
13: Storage
15: Processor
17: Display
20: Information
9A, 9B and 9C: Electronic devices
S201, S203 and S205: Steps
S301, S303, S305, S5307, S309 and S311: Steps
S401, S403, S405, S407, S409 and S411: Steps
S501, S503, S505, S507, S509 and S511: Steps

[BIOLOGICAL MERERIAL DEPOSIT]

LOCAL DEPOSIT INFORMATION [Please indicate deposit institute, date and number in order]
FOREIGN DEPOSIT INFORMATION [Please indicate deposit country, institute, date and number in order]
[SEQUENCE TABLE] (Please recite in separate sheet)
The invention claimed is:
1. A mobile device, comprising:
 a wireless communication sensor, being configured to wirelessly sense whether one or more electronic device exist around the mobile device;
 a display, being configured to display protective information according to a protecting state;
 a storage, being configured to store the protective information; and a computer processor, being electrically connected with the wireless communication sensor, the display and the storage and configured to:
  determine an authority of the one or more electronic device to be determined exist around the mobile device; and
  define a protection state for the protective information stored in the storage according to the authority;
wherein:
in response to determining the authority of all of the one or more electronic devices existing around the mobile device being permitted, the computer processor defines the protection state of the protective information to be public and displays the protective information on the display; and
in response to determining the authority of any one of the one or more electronic devices existing around the mobile device being not permitted, the computer processor defines the protection state of the protective information to be hidden and not display the protective information on the display.

2. The mobile device as claimed in claim 1, wherein the storage further stores a predetermined name list, and the computer processor is further configured to determine the authority of the one or more electronic devices according to the predetermined name list.

3. An information protection method for a mobile device, the mobile device comprising a wireless communication sensor, a display, a storage and a computer processor electrically connected with the wireless communication sensor, the display and the storage, the information protection method comprising the following steps:

enabling the wireless communication sensor to wirelessly sense whether one or more electronic device exist around the mobile device;
enabling the display to display protective information according to a protecting stat;
enabling the storage to store the protective information;
enabling the computer processor to determine an authority of the one or more electronic device to be determined exist around the mobile device;
enabling the computer processor to define a protection state for the protective information stored in the storage according to the authority;
wherein:
in response to determining the authority of all of the one or more electronic devices existing around the mobile device being permitted, the computer processor defines the protection state of the protective information to be public and displays the protective information on the display; and
in response to determining the authority of any one of the one or more electronic devices existing around the mobile device being not permitted, the computer processor defines the protection state of the protective information to be hidden and not display the protective information on the display.

4. The information protection method as claimed in claim 3, wherein the storage further stores a predetermined name list, and the computer processor determine the authority of the one or more electronic devices according to the predetermined name list.

* * * * *